Figure 1:
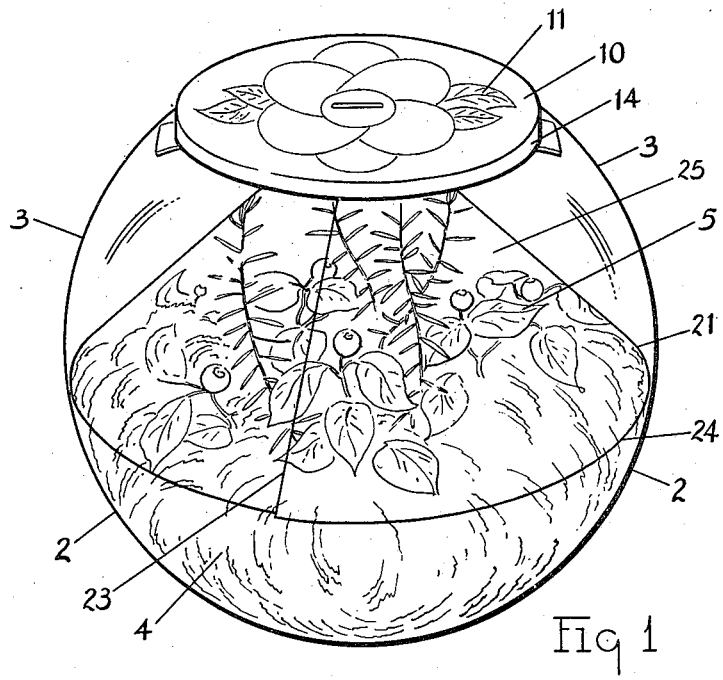

Oct. 24, 1944.   J. L. HEINL   2,361,029

PLANT GROWING CONTAINER AND CLOSURE

Filed Dec. 10, 1942    2 Sheets-Sheet 1

Inventor
J. Lawrence Heinl
By Harriet F. Crampton
Attorney

Oct. 24, 1944.  J. L. HEINL  2,361,029
PLANT GROWING CONTAINER AND CLOSURE
Filed Dec. 10, 1942  2 Sheets-Sheet 2

Inventor
J. Lawrence Heinl
By Hauit F. Crampton
Attorney

Patented Oct. 24, 1944

2,361,029

UNITED STATES PATENT OFFICE 2,361,029

PLANT GROWING CONTAINER AND CLOSURE

Joseph Lawrence Heinl, Toledo, Ohio

Application December 10, 1942, Serial No. 468,457

2 Claims. (Cl. 47—37)

My invention relates generally to a means for containing germinating seeds or a plant and a suitable growing medium therefor, in such a manner that the contents may be easily and safely handled in transit to places of trade, be attractively displayed to the trade, and be utilized to good artistic and ornamental advantage by the purchaser thereof. The invention particularly relates to providing a closure for closing the opening of a plant growing container against the escape and loss of plant sustaining moisture and the entrance of substances noxious to the health or appearance of the plant. The invention also particularly relates to a readily insertable and removable shoring means, cooperatively related to said closure, to maintain the contained contents against shifting tending to dislodge the seeds or growing plants from the growing medium.

Heretofore, it has been found that the shipping of germinating seed or plants in growing medium contained in an artistic container and the handling incidental thereto and to distribution to the place of merchandising display has resulted in breakage of the plant, disturbance and dislodgement of plant from its growing medium or of the medium relative to the container. The practice, therefore, when attempted, is soon abandoned due to the losses resulting therefrom or to the public's refusal to pay higher prices for the merchandise required to cover such losses. Therefore, the purchasing public have been relegated to filling its needs by purchasing packets of seeds or plants potted in ugly utilitarian containers. Not only is the purchaser obliged, under such a system of distribution, to arrange the planting, but also to procure an artistic container of the growing medium. Further, the inability of producers to economically ship and sell to remote markets enables producers neighboring each market to exercise and maintain exclusive control over the business transacted there, whereby the quality, variety, and price at which the products are available to the public are locally determined, often to the public's disadvantage.

Primarily, therefore, my invention has for an object to provide, in conjunction with an artistic container, a means for easily but efficiently closing the same and an inexpensive means cooperating therewith to retain the growing plant or seed in a desired relation to the growing medium, notwithstanding how the container may be tipped or tumbled in the shipping and presale handling. Thus, by the use of my invention, the complete ensemble, the germinating seed or plant, growing medium and artistic container, may be combined by any and all producers and shipped to remote, as well as neighboring markets at a price attractive and favorable to the public.

Another object of the invention is to provide, in a container of the character mentioned, an inexpensive but practical means for closing the opening thereof. Particularly, in this connection, the invention has for an object to provide a closure cap, discular or otherwise depending on the shape of the opening to which it is to be applied, having a reinforcing and sealing peripheral flange adapted to engage wall portions surrounding the opening and a resilient means adapted to yieldably hold the cap in closing relation to the opening and sealing flange thereon in contact with the container wall portions. Thus, the escape of plant sustaining moisture from the container will be prevented as well as the ingress of deteriorating substances tending to harm the plant. The resilient means which, while preventing unpremeditated dislodgement of the cap during shipping and handling in merchandising, may be easily overcome to enable release of the cap by those possessing little or no skill. The cap and said resilient means may be fabricated from any of a number of surplus materials, such as paper board, wood and the like, by relatively inexpensive machinery operated by those of but ordinary skill.

Another particular object of the invention is to provide a cap and retaining means therefor which are so characterized as to produce resilient clamping action on the container surfaces surrounding the orifice to which cap may be applied for a closing thereof which adjusts itself to the contour of said surfaces and clasps the same with retaining but undestructive pressure.

My invention has for another object to provide means, readily mountable and demountable with respect to its operative relation, for retaining the growing medium, the plant or seed and the container substantially in their installed relation despite the handling incidental to shipping and marketing. In meeting this object, the invention provides a shoring element fabricated from an inexpensive material, easily flexed and formed when in its non-operative position but rigid and sustaining when in its operative position and form. Further, the invention provides a shoring element defining a nesting chamber into which the growing plants may extend or seed grow and be protected from bruising contact with the walls of the container while the container is in transit. Also, by providing said chamber, it will be appreciated that the shoring element supplements the confining operation of the container closure at times, if any there are, when assistance in performing that operation is required.

A corollary object of the invention to the one last announced is to provide a hollow element having portions adapted to engage limited areas of the exposed surface of the growing medium and other portions adapted to engage a resilient bracing member, such as the previous mentioned closure cap or its resilient attaching means.

Thus, the engaged growing medium and its adjacent cohering parts are resiliently held against movement relative to the container, as well as are the plants embedded therein.

Further, the invention proposes to provide a special purpose footing means which may be associated with the medium engaging portions of the shoring element to extend the area of restricting engagement to which the growing medium may, if desired, be subject. In this latter connection, the invention contemplates that the material and form from which the shoring element is formed may be also advantageously used to form the footing means. Further, it is contemplated by the invention that the aforesaid shoring element and footing means, having served their mentioned purposes, shall be removed in order to effectively display the ensemble. Therefore, the invention has for an object to provide a shoring element and footing means which may be easily disposed of and of a cost commensurate with such disposition.

The invention consists in other features and advantages which will appear from the following description and upon examination of the accompanying drawings. Structures containing the invention may partake of different forms and still embody the invention. To illustrate a practical application of the invention, I have selected a plant growing container and closure as an example of the various structures and details thereof that contain the invention and shall describe the selected structure hereinafter, it being understood that variations may be made without departing from the spirit of the invention. The particular structure selected is shown in the accompanying drawings and described hereinafter.

Figure 2:
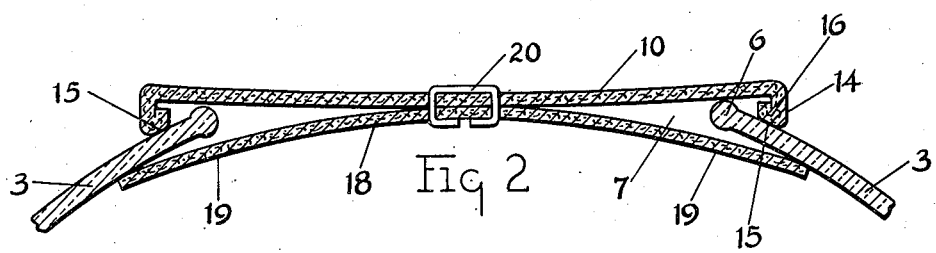
Figure 3:
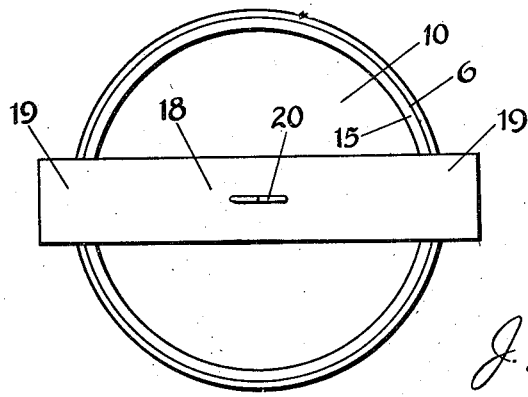
Figure 4:
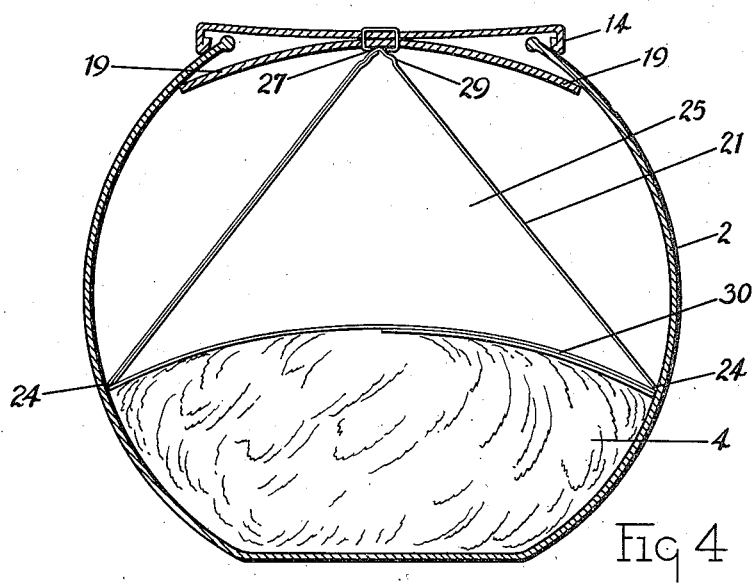
Figure 5:
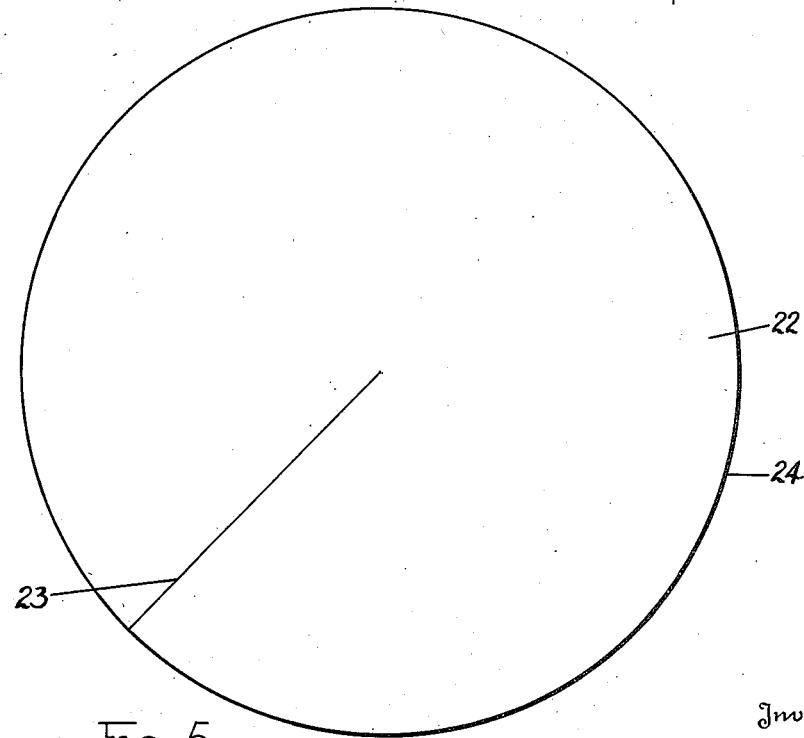

Fig. 1 of the accompanying drawings illustrates a perspective view of a plant growing container and closure embodying the features of my invention and showing the shoring element in its installed position with respect thereto. Fig. 2 of said drawings illustrates an enlarged longitudinal section of the closure shown in Fig. 1 in its closing relation to the orifice of the container. Fig. 3 of said drawings illustrates a plan view of the inner or under side of the closure shown in Fig. 1. Fig. 4 of the drawings illustrates a view of longitudinal section showing the supplemental footing means in position. Fig. 5 of the drawings illustrates a plan view of blank from which either the aforesaid shoring element or footing means may be formed.

The particular embodiment of my invention illustrated in the accompanying drawings includes a substantially spherical glass globe 2. The globe 2 may be regarded as having wall portions 3 for confining a growing medium such as moss 4 and a plant 5. The wall portions 3 terminate in a beaded edge 6 which defines a circular orifice 7 through which the plant 5 and moss 4 may be inserted within the globe 2. Thus, the globe forms a terrarium in which the plant may readily grow, the moisture which rises therefrom condensing on the inner surface of the wall portions 3 and being directed to return to the growing medium 4. Also, the plant is protected from bruising contact and damage from adjacent objects and may be easily handled and observed by prospective purchasers in the customary manner of such, without fear of disturbing the arrangement of the plant in its growing medium. Further, the globe with the plant readily lends itself to use as a table centerpiece ornament by the purchaser.

In order to efficiently but inexpensively close the orifice 7 and thereby prevent the escape of moisture and the ingress of substances deleterious to the plant or its appearance, a cap 10 is provided. The cap 10 is formed of sheet material which is of substantial impenetrability to moisture. The cap 10 shown in the accompanying drawings is formed from a paper board disc suitably impregnated with wax to render it substantially waterproof and having a diameter greater than that of the orifice 7. The cap may have applied thereto a decorative design 11 to lend further appeal and conformity to the artistic appearance of the plant within the globe 2.

Preferably, the cap 10 has a peripheral flange 14 which operates to give lateral rigidity and body to the edges of the cap. The flange 14 has an annular surface 15, the contour of which approximates the outer surface of the wall portions proximate to the orifice 7. When the cap 10 is placed in closing relation to the orifice 7, the surface 15 seats on the outer surface of said wall portions 3 and thereby substantially seals the opening. In the form of construction illustrated in the accompanying drawings, the peripheral flange 14 is formed by bending the outer edges of the paper board forming the cap 10. The edges are then bent upon themselves and crimped to form a shoulder 16. The shoulder 16 is suitably ironed to form the aforesaid contacting surface 15.

In order to provide a simple and effective means for retaining the cap 10 in closing relation to the orifice 7 against an undirected dislodgment thereof and yet enabling ready purposed disengagement, a resilient member 18 is provided. The member 18 is connected to the under or inner side of the cap as shown in Fig. 3 of the drawings and has extensions or legs 19. The legs 19 are of such length that they extend substantially beyond and terminate at points exterior of the perimeter of the cap. Thus, when it is desired to mount the cap on the globe 2, the cap is directed somewhat laterally to cause one of the legs 19 to pass through the orifice 7 and engage the inner surface of a wall portion 3 and the shoulder 16 to engage the outer surface of said wall portion. The lateral movement of the cap is continued to permit the movement of the other leg 19 through the orifice 7. The lateral movement is then reversed causing the last mentioned leg 19 to engage the inner surface of another part of the wall portion 3, spaced from the part engaged by the first leg. Further lateral movement causes the shoulder 16 to engage another part of the outer surface of the wall portion 3 spaced from the part first engaged and ultimately locates the cap 10 in closing registration with orifice 7, as illustrated in Fig. 2 of the accompanying drawings.

It will be apparent that when thus located, the legs 19 and shoulder 16 press or clamp the wall portion 3 located therebetween with a yielding but retaining pressure. Vertical lifting of the cap from the orifice 7 is yieldingly resisted by legs 19 and lateral shifting of the cap is prevented by the friction developed by clamping action of the shoulder 16 and legs 19 on the container walls. Yet with a purposeful lateral movement in prescribed directions and sequence, the cap may be easily removed from over the orifice 7. If it is merely desired to partially uncover the orifice, the cap may be laterally shifted in a direction transverse to the extension of the legs 19, to thus partially uncover the orifice without removing the legs 19 from within the globe 2 and without disconnecting the cap body from the globe body.

In the form of construction illustrated in the drawings, the member 18 and legs 19 are formed of a flexible paper board suitably impregnated to prevent absorption of moisture. The member 18 is connected to the cap body by a suitable wire stitch or staple 20 extending somewhat centrally through the discular cap and midway the ends of the legs 19. The legs extend radially with respect to the discular cap body and in diametric relation to each other. Thus, the preferred construction is fabricated from relatively inexpensive materials and may be assembled quickly and easily by automatic machinery or by relatively unskilled workers, at low cost.

The particular structure selected embodies a shoring element in the member 21, shown in Figs. 1 and 4 of the accompanying drawings. Preferably, the member 21 is formed from a blank 22 of sheet material, such as a transparent paper or the like. The blank 22 is preferably circular in outline and has a radially extending slit forming the edges 23. The circular perimeter portion 24 of the blank 22 when installed is adapted to engage certain areas of the exposed surface of the growing medium 4 within the globe 2. The blank 22 is rolled to bring portions thereof adjacent to the edges 23, in overlapping relation. By so doing, it will be appreciated the blank 22 will take on a somewhat conical form defining a conical chamber 25, the perimeter portion 24 defining the base thereof. As shown in Fig. 1 of the drawings, the chamber 25 is used to good advantage as a growing space for the plant 5 and the walls of the chamber serve to restrain the leaves of said plant against bruising contact with the globe walls 3.

In order to install the shoring element within the globe 2, the blank 22 is rolled quite tightly so that the dimension across the base, when thus rolled, is less than the diameter of the orifice 7. The thus rolled blank may then be passed, the perimetrical portion 24, foremost, through the orifice and released within the globe 2. The inherent resiliency of the blank causes it to partially unroll on release bringing the portion 24 into engagement with growing medium 4 and enclosing the foliage of the plant 5 within the chamber 25.

It is proposed that the shoring element shall engage a bracing means and transmit the resistance to movement characterized by said bracing means through the structure of the shoring element and against the areas of the growing medium 4 engaged by its engaging portion. In the particular embodiment selected here for illustration, the cone formed from the blank 22 provides near its apex a portion 27 adapted to engage a bracing means. In order to provide a cushion or resilient transmission of movement resisting force through the sides of the cone to the perimetrical portion 24, the portion 27 is crinkled or bent slightly, as shown at 29. By so bending the portion 27, the area of the surface, at this point, engageable by the bracing means is likewise increased and their association rendered more secure.

The bracing means aforementioned, may be embodied as shown in the particular embodiment selected, in the closure cap 10 with its associated resilient member 18. Thus, the portion 27 may engage the underside of the cap to brace the shoring element in its described operative position. It will be appreciated that the resilient resistance to movement of the cap 10 will be thus advantageously applied by the perimetrical portion 24 to retain the growing medium 4 in position within the globe 2. It will be further appreciated that the confining character of the walls of the chamber 25 serve to supplement the operation of the cap 10 in protecting the plant 5 from exposure to undesirable external agents or conditions.

Should it be desired to engage the growing medium over a greater area than that provided by the portions 24, a footing means 30 may be supplementally used with said shoring element. The footing means may be formed from a blank similar in configurative detail to that of the blank 22 and, for the particular globe 2 shown in Fig. 4, of lesser diametrical dimension. The blank forming the footing means 30 may be conically rolled to permit insertion through the orifice 7 and when released occupies the position in which it is shown in Fig. 4. The shoring element may then be inserted into the globe so that the portions 24 thereof engage the upper surface of footing blank and tend to press the footing blank firmly against the growing medium 4. The foregoing provision of the footing blank particularly lends itself to uses where dormant seed is embedded in a substantially dehydrated growing medium. The user need merely remove the shoring element and footing means and add water to institute the germination of the seed.

The blank 22 and the footing means 30 being of an inexpensive material and readily crushable, the used blank may be easily disposed of after removal from the globe.

While in accordance with the provisions of the statutes, I have illustrated and described the best forms of my invention now known to me, those skilled in the art will readily understand that many changes may be made in the forms of construction disclosed, without departing from the spirit of my invention as set forth in the appended claims.

I claim:

1. In combination with a plant growing container having an orifice, a closure cap for closing said orifice having a laterally extending body portion; a member having a flexible leg and connected to said cap body portion; the leg adapted to engage a surface of the container wall portions; and a shoring element having portions engaging the plant growing medium and other portions engaging the cap whereby the cap and shoring element are resiliently braced against movement and the plant growing medium retained substantially in its installed position within the container.

2. In combination with a plant growing container having an orifice, a closure cap for closing said orifice having a laterally extending body portion; a member having a flexible leg and connected to said cap body portion; the leg adapted to engage a surface of the container wall portions; a shoring element; and a footing sheet member extending laterally over the surface of the plant growing medium, the shoring element having portions engaging the footing member and other portions engaging the cap whereby the footing member is pressed against the surface of the growing medium and confined against movement relative to the container.

J. LAWRENCE HEINL.